United States Patent Office 2,971,014
Patented Feb. 7, 1961

2,971,014

OIL SOLUBLE METAL CONTAINING COMPOSITIONS AND PROCESS FOR MAKING SAME

Thomas W. Mastin, Willoughby, Ohio, assignor to The Lubrizol Corporation, Wickliffe, Ohio, a corporation of Ohio No Drawing. Continuation of application Ser. No. 539,670, Oct. 10, 1955. This application Sept. 26, 1958, Ser. No. 763,443

12 Claims. (Cl. 260—398)

This invention relates to a novel method for the preparation of oil-soluble compositions which contain large amounts of metal. In a more particular sense it relates to an improved method of incorporating large amounts of metal with hydroxy-aromatic compounds to form oil-soluble compositions. The products which are formed by this method are useful as lubricant additives which may be used as dispersing agents in motor oils.

The development of the lubricant additive field in recent years has indicated the value of the relative metal content of an additive which is employed for its dispersant qualities. The phenomenon by which certain compositions are enabled to prevent the agglomeration of insoluble particles in a motor oil has come to be known by the somewhat misleading term "detergency," and the degree of detergency resulting from the use of a particular additive appears to be related not so much to the amount of such additive, but rather to the amount of metal which is present in the additive.

Various metal salts are known to have sufficient dispersant properties to be regarded as effective detergents. Among these are the metal salts of carboxylic acids, sulfonic acids, phenols, phosphorus acids, etc. The term "metal salt" is used to denote a compound in which all of the valences of the metal are satisfied by attachment to the anions of the particular acid.

It was soon learned that the basic metal salts provided a higher degree of detergency than did normal salts. These basic salts were salts of polyvalent metals and were prepared quite conveniently by heating an equimolar mixture of a normal salt and the corresponding polyvalent metal oxide or

R—SO₃—M—OH hydroxide. The presumed structure of such basic salts is shown by the above illustration of a basic sulfonate, in which a portion of the valences of the polyvalent metal is satisfied by attachment to hydroxyl groups. It will be noted that such basic salts contain a higher percentage of metal than do the corresponding normal salts.

Further study showed that still higher percentages of metal could be incorporated into oil-soluble compositions by the use of so-called "promoters." These promoters generally are phenolic or enolic compounds and it was found that they could be used with certain sulfonates, carboxylates, etc., to prepare oil-soluble compositions containing still higher percentages of metal than was possible heretofore. Furthermore, it was learned also that these compositions possessed even greater dispersant powers than had been realized prior to this development.

It is a principal object of the present invention to provide a novel process for the preparation of oil-soluble compositions which contain a large percentage of metal.

It is also an object of the present invention to provide novel compositions which may be used as lubricant additives.

A further object of the present invention is to provide an oil-soluble composition which is an effective dispersant when incorporated in small amounts in motor oils.

These and other objects are accomplished by the process of preparing oil-soluble compositions containing large amounts of metal which comprises preparing a mixture of (a) an alkylated monohydroxy aromatic compound, (b), and oil-soluble, metal-free non-tautomeric organic polar compound selected from the class consisting of neutral and basic compounds present in an amount greater than that of (a) on a weight basis, and (c) at least two equivalents of a basic inorganic metal compound per equivalent of (a) and heating said mixture to drive off substantially all free water which may be present and then treating said water-free mixture with an acidic gas having an ionization constant greater than that of (a) until the titratable basicity of the mixture has been substantially reduced.

The alkylated hydroxy aromatic compounds contemplated for use in the above process are particularly those which yield oil-soluble metal phenates and in which an alkyl group contains at least about three carbon atoms. Such alkyl groups as isopropyl, tertiary-butyl, 2-methylamyl-4, isoheptyl, diisobutyl, n-decyl, tetrapropyl, octadecyl, polyisobutyl (derived from polyisobutylene fractions of various molecular weights), etc. are illustrative of the groups which may be used. In lieu of alkyl groups, cycloalkyl groups such as, e.g., cyclohexyl, methyl-cyclohexyl, etc. may be used. The hydroxy aromatic compound may contain other groups in addition to the alkyl or cycloalkyl groups. Thus, halogen, nitro, alkoxy, etc. groups may be present. Likewise the aldehyde condensation products of the above-described alkylated hydroxy aromatic compounds are contemplated.

The basic inorganic metal compounds include principally metallic oxides and hydroxides and in some instances the sulfides, hydrosulfides, etc. These compounds are derived from metals of groups I and II of the periodic table and especially suitable are those derived from metals of the alkali and alkaline earth subclass, particularly those derived from barium.

As indicated this basic inorganic metal compound should be used in the process in an amount equal to at least two equivalents per equivalent of the alkylated monohydroxy aromatic compound. Inasmuch as the principal object of the invention is to provide a process for the preparation of oil-soluble compositions which contain large percentages of metal it is apparent that any amount of such basic inorganic metal compound in excess of this minimum amount can be used, up to that amount which is no longer effective to increase the proportion of metal in the oil-soluble product.

The process mixture generally contains some water which is added to aid in fluidizing the inorganic metal compound. It is necessary that this water be removed from the mixture before the process can be effected. Removal of the water is a simple matter, involving only its distillation from the process mixture. The temperature at which the mass is treated with an acidic gas usually is above 100° C., and in the course of heating the process mixture to this temperature the last traces of free water are substantially eliminated.

The oil-soluble, metal-free, non-tautomeric neutral and basic organic polar compounds are characterized by having both an oil-solubilizing substituent, such as a long hydrocarbon chain, and also by having a non-acidic polar group such as an ester, amide, amine, hydroxy, sulfoxy, ether, sulfide, etc. group. Some specific examples of such polar compounds include the following: glyceryl oleate or stearate, octadecenyl or oleyl alcohol, tridecyl alcohol, N-octadecyl propylene diamine, sperm oil, etc. The most suitable organic polar compounds have been found to be those which contain a total of at least 12 aliphatic carbon atoms in the molecule. For an appropriate discussion of the word "tautomeric," reference may be had to "Advanced Organic Chemistry," by G. W. Wheland, John Wiley & Sons, New York, 1949, chapter 14.

The use of the above-described polar compounds in the process of this invention appears to have a solubilizing effect with respect to the basic inorganic metal compound which is incorporated into the ultimate product. This is an unexpected function for such neutral and basic non-tautomeric materials and it is not clear how such a function can be explained in terms of the molecular structure of a non-acidic compound. The previous use of such compounds in fluidizing and imparting filterability to oleaginous compositions is well-known, but so far as I am aware, it has not been known that neutral or basic non-tautomeric metal-free polar compounds are capable of sustaining the solubility of otherwise insoluble metal compositions in oil which do not also contain any of the well-known dispersants, such as sulfonates or carboxylates.

It is quite probable that the neutral or basic non-tautomeric polar compound has certain hitherto unknown dispersant qualities which enable it to preserve the basic inorganic metal compound in a colloidal suspension, although as indicated previously, it is not known just how it really does operate.

By the term "acidic gas" is meant one which upon reaction with water would produce an acid. Thus, such gases as sulfur dioxide, sulfur trioxide, carbon dioxide, carbon disulfide, hydrogen sulfide, nitric oxide, etc. are exemplary of the acidic gases which are useful in the process of this invention. Of these carbon dioxide, because of its low cost and particular utility in the process, is preferred.

The treatment with an acidic gas is conducted in such a manner as to reduce substantially the titratable basicity of the mass. There are essentially two materials in the mass prior to carbonation which are susceptible to reaction with the acidic gas: the free metal base (that which is in excess of the stoichiometric quantity required to form the normal phenate) and the metal phenate. It is possible that each of these materials reacts with the acidic gas (e.g., is carbonated) simultaneously, but it is more likely that the excess metal base reacts first and when this reaction is complete the metal phenate reacts. It is understood of course that reaction of the metal phenate results in the liberation of the phenol from its metal salt.

The amount of acidic gas which is used in the process depends in some respects upon the desired basicity of the particular product in question. Thus, in the case of a highly basic product only a small amount of acidic gas will be required. Ordinarily, however, a less basic product is desired and in such instances a larger amount of acidic gas is used. A particularly preferred product is one in which the basicity has been substantially neutralized, i.e., one in which the neutralization number is less than about 10. The preparation of such a neutral product entails the use of a rather large amount of acidic gas, i.e., more than 25 percent by weight of the amount of the metal phenate which is being so treated. Generally, more than the theoretical quantity of acidic gas is required to achieve any desired degree of basicity in a particular product.

In some instances a more basic product may be acceptable and the preparation of such products will require the use of only 10–25 percent by weight of acidic gas, based on the metal phenate being treated.

The treatment of the above-described process mixture with acidic gas appears to have two quite beneficial effects. It has a clarifying effect on both the process mixture and on the ultimate product, and it allows the incorporation of significantly more metal into the oil-soluble product. It is apparent that this latter effect can be realized only when there is present in the reaction mixture an appreciable quantity of oil-insoluble metal base. Thus, it is important for the incorporation of the maximum amount of metal that the process mixture not be separated (as, e.g., by filtration) from oil-insoluble metal base before carbonation.

The compositions which may be prepared by the process of this invention are readily adaptable for use as dispersants in motor oils. Such compositions provide a desirable alkaline reserve in a crankcase and are satisfactorily stable over long periods of time under the conditions of normal engine operation.

Although mineral lubricating oils containing the modified metal salts described herein are valuable in lubricating oils, it is sometimes desirable to include one or more other dispersants and/or one or more anti-oxidants or anti-corrosion agents in the final lubricating oil composition along with these modified salts.

Dispersants which may be so employed include principally the metal mahogany sulfonates. Such sulfonates may be either the normal or the basic sulfonates. A particularly preferred supplemental dispersant which may be employed is an acidic gas-treated basic sulfonate. Such a product is prepared merely by heating a normal metal sulfonate with a basic metal compound and then treating the product with acidic gas.

The following examples illustrate some of the details of the process of this invention. The term "metal ratio" employed in this specification is the ratio of total metal in the oil-soluble composition to total equivalents of alkylated hydroxy-aromatic compound present. It is thus a convenient measure of the amount of excess metal present in the composition, i.e., that amount of metal in excess of the stoichiometric amount required to satisfy the organic salt-forming anions present

Example 1

A sulfoxide was prepared treating polyisobutylene of 750 average molecular weight with 47.5 percent of its weight of $SOCl_2$ for 4.5 hours at 200°–220° C. A mixture of 787 grams (1.0 equivalent) of this sulfoxide, 124 grams (0.6 equivalent) of diisobutyl phenol, 550 grams of mineral oil and 200 grams of water was warmed to 70° C. and then treated with 306 grams (4.0 equivalents) of barium oxide. This mixture was heated at reflux temperature for one hour and then treated at 150° C. with carbon dioxide until the mixture was substantially neutral. The resulting mixture was filtered through Hyflo to yield a clear oil-soluble liquid having the following analyses:

Percent sulfate ash _____ 22.8
Neut. No. _____(basic)__ 5.8
Metal ratio _____ 5.8

Example 2

To a mixture of 268 grams (1.0 equivalent) of oleyl alcohol, 675 grams of mineral oil, 124 grams (0.6 equivalent) of diisobutyl phenol, and 146 grams of water, at 70° C. there was added 308 grams (4.0 equivalents) of barium oxide. This mixture was heated at reflux temperature for one hour, then at 150° C. while a stream of carbon dioxide was bubbled through the mixture until it was substantially neutral. The thus acidified mixture was filtered and the clear brown oil-soluble filtrate found to have the following analyses:

Percent sulfate ash _____ 29.8
Neut. No. _____(basic)__ 2.6
Metal ratio _____ 6.0

Example 3

A mixture of 268 grams (1.0 equivalent) of oleyl alcohol, 90 grams (0.6 equivalent) of tertiary-butyl phenol, 1114 grams of mineral oil and 190 grams of water was warmed to 70° C., treated with 306 grams (4.0 equivalents) of barium oxide and then heated to 150° C. A stream of carbon dioxide was bubbled into the mixture at this latter temperature until the mixture was substantially neutral. Filtration through Hyflo yielded a clear brown oil-soluble filtrate with the following analyses:

Percent sulfate ash _____ 23.4
Neut. No. _____(basic)__ 6.7
Metal ratio _____ 6.2

*Example 4*

To a mixture of 268 grams (1.0 equivalent) of oleyl alcohol, 124 grams (0.6 equivalent) of heptyl phenol, 1034 grams of mineral oil, and 190 grams of water there was added at 70° C. 306 grams (4.0 equivalents) of barium oxide. This mixture was heated at reflux temperature for an hour and then treated with sulfur dioxide at 150° C. until the mixture was acidic. The mixture was filtered through Hyflo to yield a product having the following analyses:

Percent sulfate ash _____ 20.9
Neut. No. _____(acidic)__ 3.0
Metal ratio _____ 5.3

*Example 5*

To a mixture of 268 grams (1.0 equivalent) of oleyl alcohol, 124 grams (0.6 equivalent) of heptyl phenol, 988 grams of mineral oil and 160 grams of water there was added 168 grams (4.0 equivalents) of lithium hydroxide monohydrate. This was heated at reflux temperature for an hour and then treated with carbon dioxide at 150° C. until it was substantially neutral. Filtration of this carbonated mixture yielded a liquid having the following analyses:

Percent sulfate ash _____ 12.7
Neut. No. _____(basic)__ 2.0
Metal ratio _____ 5.8

*Example 6*

To a mixture of 500 grams (1.0 equivalent) of polyisobutylphenoxyethanol, 124 grams (0.6 equivalent) of heptyl phenol, 848 grams of mineral oil and 190 grams of water there was added at 70° C., 306 grams (4.0 equivalents) of barium oxide. This mixture was heated at reflux temperature for an hour at 150° C. while bubbling carbon dioxide beneath the surface for three hours. The carbonated mixture was filtered through Hyflo to yield a liquid product having the following analyses:

Percent sulfate ash _____ 23.8
Neut. No. _____(basic)__ 9.7
Metal ratio _____ 6.3

*Example 7*

A mixture of 423 grams (1.0 equivalent) of sperm oil, 124 grams (0.6 equivalent) of diisobutyl phenol, 520 grams of mineral oil and 146 grams of water was prepared, heated to 70° C. and then treated with 308 grams (4.0 equivalents) of barium oxide. This mixture was refluxed for an hour then dried by heating to 150° C. and carbonated by treatment with carbon dioxide at this temperature until it was slightly acidic. Filtration of this material yielded a clear light brown, non-viscous liquid having the following analyses:

Percent sulfate ash _____ 31.2
Neut. No. _____(acidic)__ 0.4
Metal ratio _____ 6.3

*Example 8*

A mixture of 1269 grams (3.0 equivalents) of sperm oil, 522 grams (1.8 equivalents) of a heptyl phenol-formaldehyde condensation product, 2169 grams of mineral oil, 540 grams of water was treated at 70° C. with 1134 grams (14.8 equivalents) of barium oxide. This mixture was stirred at reflux temperature for one hour then at 150° C. while carbon dioxide was bubbled beneath the surface. Filtration yielded a clear liquid having the following analyses:

Percent sulfate ash _____ 32.7
Neut. No. _____(basic)__ 1.9
Metal ratio _____ 8.2

*Example 9*

To a mixture of 915 grams (2.2 equivalents) of a sulfurized sperm oil, 273 grams (1.3 equivalents) of diisobutyl phenol, 1715 grams of mineral oil, and 396 grams of water there was added at 70° C. 833 grams (10.8 equivalents) of barium oxide. This mixture was heated at reflux temperature for an hour and then at 150° C. at which temperature carbon dioxide was bubbled through the mixture until it was substantially neutral. The mixture was filtered through Hyflo to yield a liquid having the following analyses:

Percent sulfate ash _____ 28.7
Neut. No. _____(basic)__ 2.9
Metal ratio _____ 7.0

*Example 10*

To a mixture of 174 grams (1.0 equivalent) of N-octadecyl propylene diamine, 124 grams (0.6 equivalent) of diisobutyl phenol, 766 grams of mineral oil, 146 grams of water there was added 306 grams (4.0 equivalents) of barium oxide and the whole was refluxed for an hour. Water was removed by raising the temperature to 150° C. whereupon carbon dioxide was bubbled through the mixture at this temperature until it was substantially neutral. The mixture was filtered through Hyflo to yield a clear oil-soluble liquid having the following analyses:

Percent sulfate ash _____ 28.9
Neut. No. _____(basic)__ 2.5
Metal ratio _____ 5.8

*Example 11*

To a mixture of 516 grams (2.0 equivalents) of a N-octadecyl propylene diamine-ethylene oxide condensation product, 346 grams (1.2 equivalents) of a heptyl phenol-formaldehyde condensation product, 1776 grams of mineral oil and 360 grams of water there was added 756 grams (9.9 equivalents) of barium oxide. After refluxing this mixture for one hour the temperature was raised to 150° C. and carbon dioxide was bubbled through the mixture until it was substantially neutral. Filtration through Hyflo yielded a liquid product having the following analyses:

Percent sulfate ash _____ 29.6
Neut. No. _____(basic)__ 0.8
Metal ratio _____ 7.4

The use of larger amounts of the basic metal compound of component (c) in the process is shown by the tabulated data of Examples 12–16. Each of these examples involved the reaction of 1.0 equivalent of sperm oil, 0.15 equivalent of diisobutyl phenol and a variable amount of barium oxide as indicated in the table. Water was used in an amount equal to 15% of the total reaction mixture and an amount of oil was used as a diluent such that the theoretical sulfate ash content of the mixture was 32.0%. The procedure of Example 7 was followed.

| Ex. No. | BaO | (c)/(a) | Percent sulfate ash | Neut. No. | Metal Ratio |
| --- | --- | --- | --- | --- | --- |
| 12 | 3.75 | 25 | 30.4 | [1] 0.5A | 23.8 |
| 13 | 5.25 | 35 | 31.0 | [2] 0.7B | 34.0 |
| 14 | 7.5 | 50 | 30.4 | 1.0B | 47.5 |
| 15 | 11.3 | 75 | 26.2 | 1.3B | 61.5 |
| 16 | 15.0 | 100 | 20.1 | 1.4B | 62.8 |

[1] Acidic.
[2] Basic.

It will be noted that the incorporation of increased amounts of metal into the oil-soluble product continues to characterize the process when the ratio (c) to (a) is as high as 75:1, but that further increase of this ratio has very little effect with respect to the incorporation of metal into the oil-soluble product.

This application is a continuation of application Serial No. 539,670, filed October 10, 1955, now abandoned.

Other modes of applying the principle of the invention may be employed, change being made as regards the details described, provided the features stated in any of the following claims, or the equivalent of such, be employed.

I therefore particularly point out and distinctly claim as my invention:

1. The process of preparing oil-soluble compositions containing stochiometrically large amounts of metal which comprises preparing a mixture of (a) an alkylated phenol,
   (b) an oil-soluble, metal-free, non-tautomeric polar compound having at least 12 aliphatic carbon atoms, selected from the class consisting of sulfoxides, esters, alcohols and amines in an amount greater than that of (a) on a weight basis, and
   (c) at least two equivalents of a basic inorganic metal compound selected from the class consisting of barium and lithium oxides and hydroxides, per equivalent of (a), and heating said mixture to drive off substantially all free water which may be present and then treating said water-free mixture with an acidic gas selected from the class consisting of carbon dioxide and sulfur dioxide until the titratable basicity of the mixture has been reduced to a base number less than 10.

2. The process of claim 1 characterized further in that the oil-soluble, metal-free compound of (b) is a neutral compound.

3. The process of claim 1 characterized further in that the alkylated phenolic compound of (a) is diisobutyl phenol.

4. The process of claim 1 characterized further in that the oil-soluble, metal-free, non-tautomeric polar compound of (b) is an alcohol.

5. The process of claim 1 characterized further in that the oil-soluble, metal-free, non-tautomeric polar compound of (b) is an ester.

6. The process of claim 1 characterized further in that the oil-soluble, metal-free, non-tautomeric polar compound of (b) is sperm oil.

7. The process of claim 1 characterized further in that at least 5.0 equivalents of the basic inorganic metal compound of (c) is used per equivalent of (a).

8. The process of claim 1 characterized further in that the acidic gas is carbon dioxide.

9. The process of claim 1 characterized further in that the basic inorganic metal compound of (c) is present in the mixture in an amount up to the limit of solubility of the metal in the product of the process.

10. The process of claim 1 characterized further in that the basic inorganic metal compound of (c) is present in the mixture in an amount up to about 75 equivalents per equivalent of (a).

11. The process of claim 1 characterized further in that the product thereof has a metal ratio up to about 62.

12. The process of claim 1 characterized further in that the alkylated phenol of (a) is heptyl phenol.

References Cited in the file of this patent

UNITED STATES PATENTS 2,616,924    Assef et al.    Nov. 4, 1952